United States Patent [19]
Brown

[11] Patent Number: 6,129,253
[45] Date of Patent: Oct. 10, 2000

[54] TRUNK CADDY

[76] Inventor: John T. Brown, 1806 Laurel Brook Rd., Fallston, Md. 21047

[21] Appl. No.: 09/175,170

[22] Filed: Oct. 20, 1998

[51] Int. Cl.[7] ....................................................... B60R 11/00
[52] U.S. Cl. ............................ 224/545; 224/548; 224/550; 224/555; 224/556; 224/558; 224/563; 224/564
[58] Field of Search .................................... 224/563, 500, 224/529, 536, 537, 323, 327, 547, 548, 550, 555, 556, 558, 564, 565, 560, 571, 275, 311, 544, 551, 545

[56] References Cited

U.S. PATENT DOCUMENTS

| | | |
|---|---|---|
| 1,204,416 | 11/1916 | Dosen . |
| 4,560,096 | 12/1985 | Lucas et al. ............................. 224/411 |
| 5,340,004 | 8/1994 | Moore ..................................... 224/563 |
| 5,366,124 | 11/1994 | Dearborn, IV. . |
| 5,368,210 | 11/1994 | Wotring . |
| 5,381,940 | 1/1995 | Wright . |
| 5,556,064 | 9/1996 | Cowe . |
| 5,628,442 | 5/1997 | Wayne . |
| 5,769,293 | 6/1998 | Zaretsby . |

*Primary Examiner*—Gregory M. Vidovich
*Assistant Examiner*—Maerena W. Brevard
*Attorney, Agent, or Firm*—Law Offices of Royal W. Craig

[57] ABSTRACT

An trunk caddy particularly configured to cradle a golf bag in an easily accessible position above the floor of the vehicle trunk compartment, the cradle being supported at either side by adjustable straps which attach to the rim of the trunk compartment opening using generally S-shaped brackets.

20 Claims, 3 Drawing Sheets

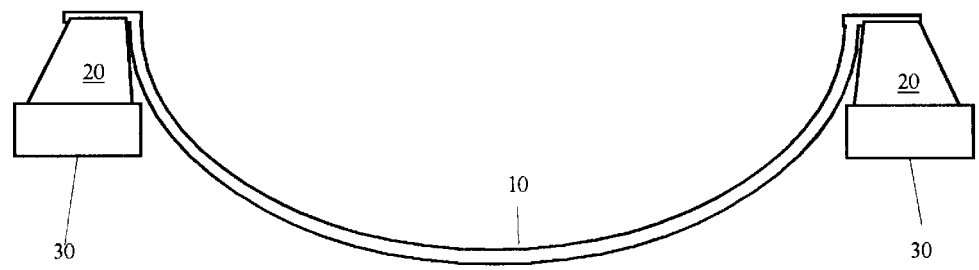
FIG. 4
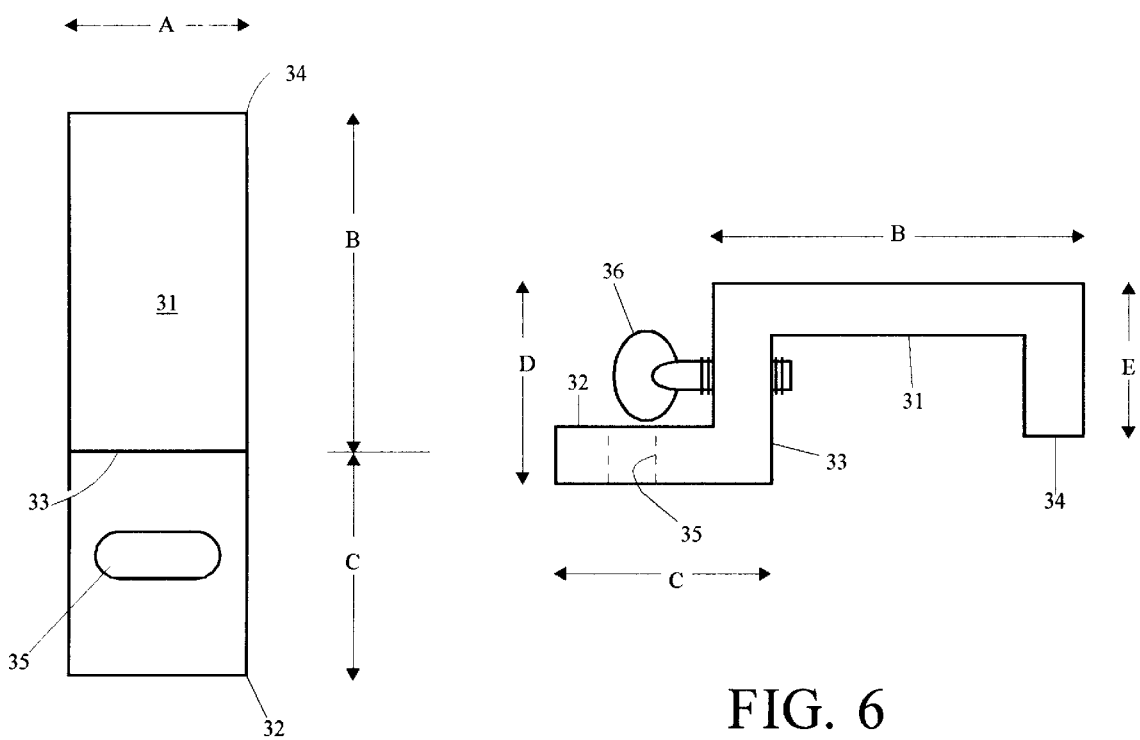
FIG. 5
FIG. 6

TRUNK CADDY

BACKGROUND OF THE INVENTION

1. Field of the invention

The present invention relates to storage devices for an automobile trunk and, more particularly, to a suspended automobile trunk caddy storage unit. The trunk caddy is particularly configured to suspend a golf bag in an easily accessible position above the floor of the auto trunk compartment.

2. Description of the Background

Golf enthusiasts are often faced with the problem of inadequate storage space for transporting their golf clubs, bags and accessories to the golf course. Most golfers transport their golf bags in the trunk of their vehicle in order to conserve space on the interior of the vehicle and to not excessively crowd or deform the golf bag, and further to alleviate the back stress associated with bending over to either place or remove the bag from the vehicle's interior.

However, the typical storage space available within the trunk compartment of most vehicles is entirely inadequate. Many modern vehicles are equipped with deep trunk compartments. In such vehicles, the placement or removal of any object from the bottom of the trunk well requires a person to bend at the waist to either place the object on the floor of the trunk well, or to lift the object off of the floor of the trunk well. When bearing a fully loaded golf bag, any bending at the waist causes excessive stress on a golfer's back both in the placement and the removal of the bag.

Further, although many vehicles are equipped with a deep well, traditional placement of the golf bag on the floor of the trunk well consumes all available space within the trunk compartment. Such limited space requires the golfer to empty his or her vehicle trunk compartment of all additional miscellaneous items that might be stored in the trunk compartment prior to any golfing excursion. Moreover, the golfer is effectively prevented from carrying multiple golf bags or their golfing accessories.

It has also been found that trunk compartments can damage the clubs. As the clubs lie across the trunk, the tire wells protrude upwardly and elevate the club heads. As a result, the entire weight of the golf bag is supported by the neck of a few clubs. Rough travel over bumps and ruts can result in sever bending or scratching of the club faces.

One prior patent does illustrate a device for holding a golf bag within the trunk compartment of a vehicle above the floor of the trunk well in a cradle type assembly. U.S. Pat. No. 5,556,064 to Cowe (1996) discloses a cradle comprising two rounded end brackets supporting the ends of a golf bag from below, each of which is attached to a vertical support member which in turn extends upward from horizontal frame members resting on the floor of the trunk compartment well. While the device does attempt to position the golf bag in an elevated position within the trunk compartment, it requires a horizontal and vertical framework which continues to make unusable the potential storage space below the suspended golf bag.

Accordingly, it would be a great advantage to provide a device for suspending a golf bag or any other articles within the trunk compartment of a vehicle, thereby minimizing lifting or bending at the waist, affording good protection to the suspended articles, and making the most efficient use of available space within the trunk compartment (in such a way as to maintain the remaining extent of the storage space within the trunk compartment in a usable fashion).

SUMMARY OF THE INVENTION

It is, therefore, an object of the present invention to provide a cradle for supporting a golf bag or other articles in an elevated position within the trunk compartment of a vehicle without rendering unusable the remaining storage space within the trunk compartment.

It is another object of the present invention to provide a golf bag support for the trunk compartment of a vehicle which maintains the golf bag in a horizontal position during transport.

It is yet another object of the present invention to provide a golf bag support for the trunk compartment of a vehicle which may be adjusted to fit trunk compartments of various sizes and dimensions.

It is still yet another object of the present invention to provide a cradle for suspending a golf bag within the trunk compartment of a vehicle that does not interfere with the opening of the trunk, and which elevates the club heads to prevent scratching of the club faces or bending of the club heads.

These and other objectives are accomplished through an improved cradle support for suspending a golf bag above the floor of the trunk compartment of a vehicle. The support is provided with a plurality of nearly S-shaped clamps at opposing ends thereof, the clamps being configured for attachment to the channel which runs around the rim of a standard vehicle trunk compartment opening. A corresponding plurality of adjustable straps is provided for attaching each of the clamps to a central cradle section which is contoured to the lower portion of a standard golf bag. The overall length of each of the straps may be adjusted in order to fit the cradle support to a vehicle trunk compartment having any size opening. In a first embodiment, the central cradle portion is formed of a rigid material, such as plastic or metal. In a second embodiment, the central cradle portion is formed of a flaccid fabric or netting. The improved cradle support will thus suspend the golf bag, and any other articles placed therein, above the floor of the vehicle trunk compartment, without rendering the storage space below the golf bag unusable.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 4 is an end view of the cradle 10 of the storage unit.

FIG. 5 is a top view of a clamp 30 for attachment of the cradle 30 to a trunk opening.

FIG. 6 is a side view of a clamp 30 for attachment of the cradle to a trunk opening.

DETAILED DESCRIPTION OF THE PREFERRED EMBODIMENTS

Figure 1:
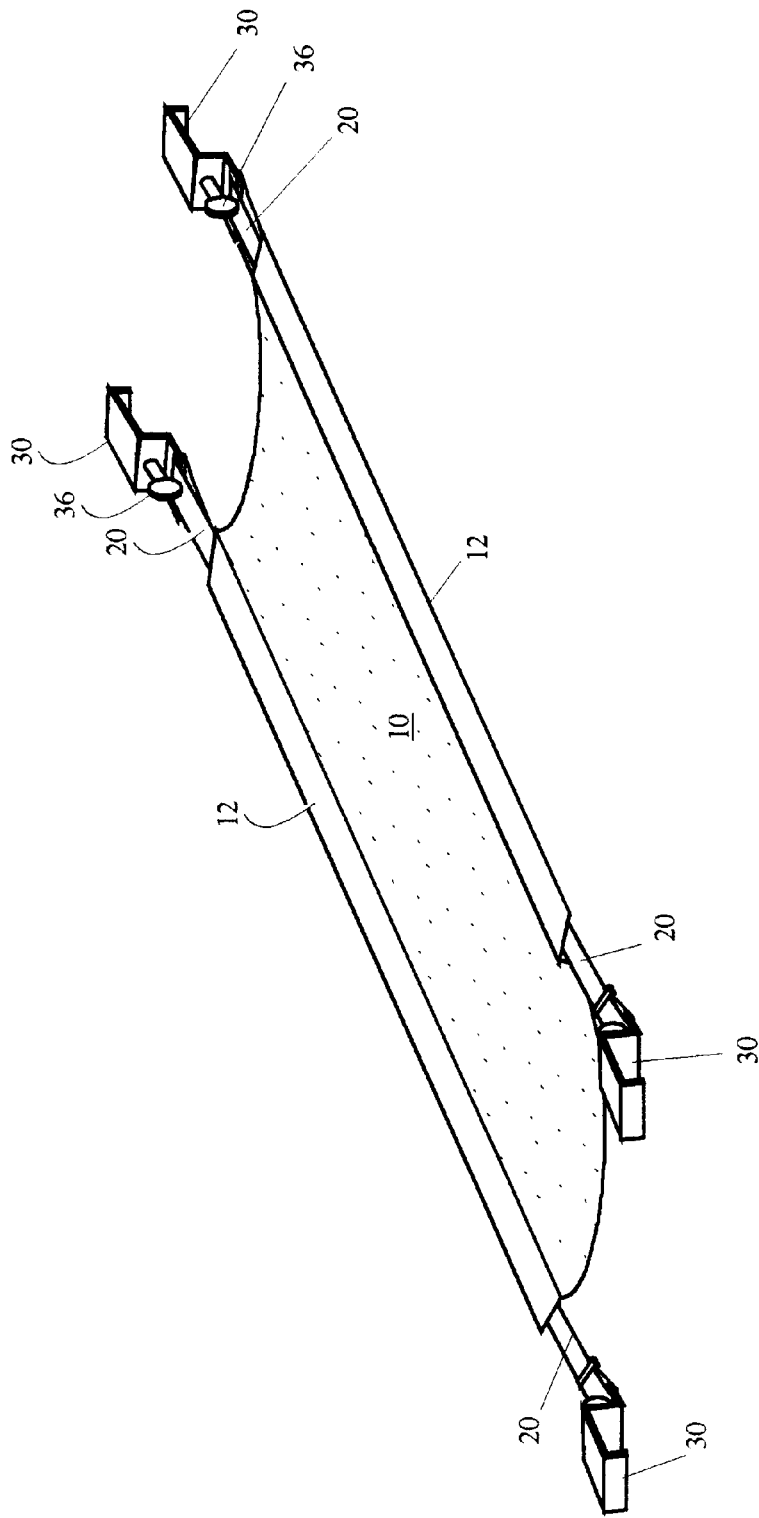
FIG. 1 is a top perspective view of an trunk caddy for a golf bag according to one embodiment of the present invention.

FIG. 1 is a top perspective view of the trunk caddy for transporting a golf bag or any other articles according to one embodiment of the present invention.

The trunk caddy comprises a central cradle portion 10, a plurality of adjustable straps 20 attached to both ends of cradle 10, and a corresponding series of clamps 30 for attachment to the channel 100 (FIG. 2) that encircles the rim of a conventional automobile trunk compartment opening.

Figure 2:
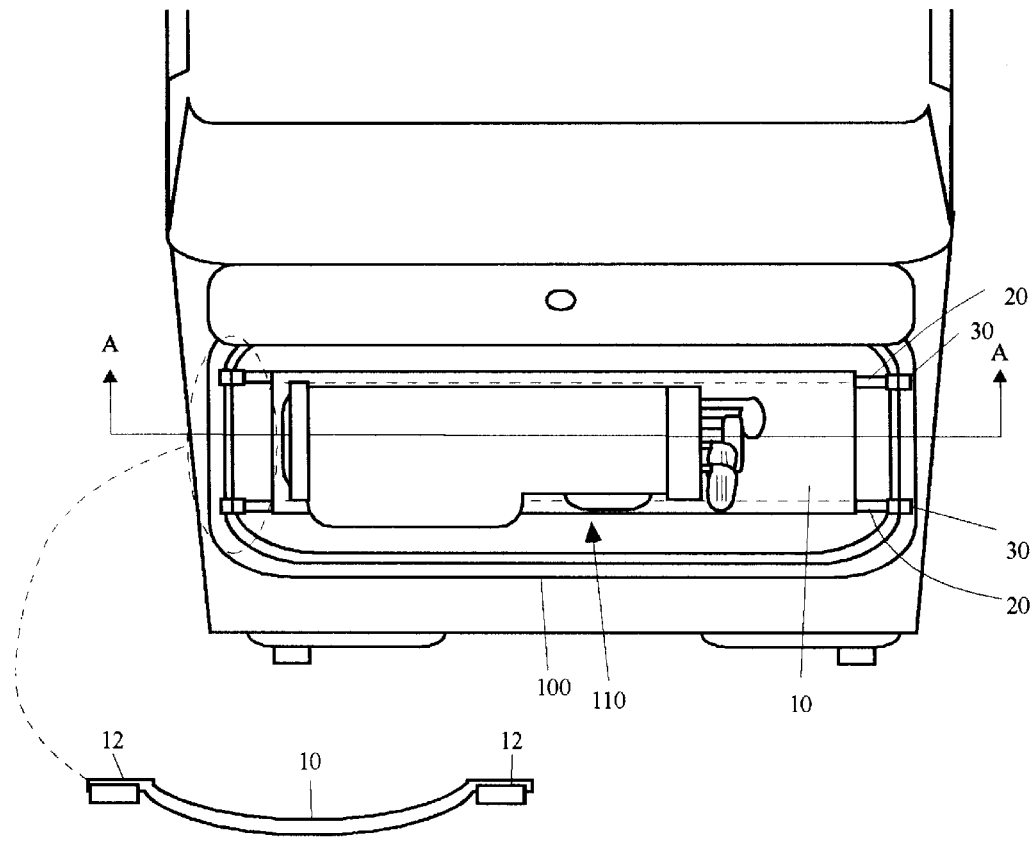
FIG. 2 is a top view of the trunk caddy for transporting a golf bag as in FIG. 1 attached to the opening of the trunk compartment.
Figure 3:
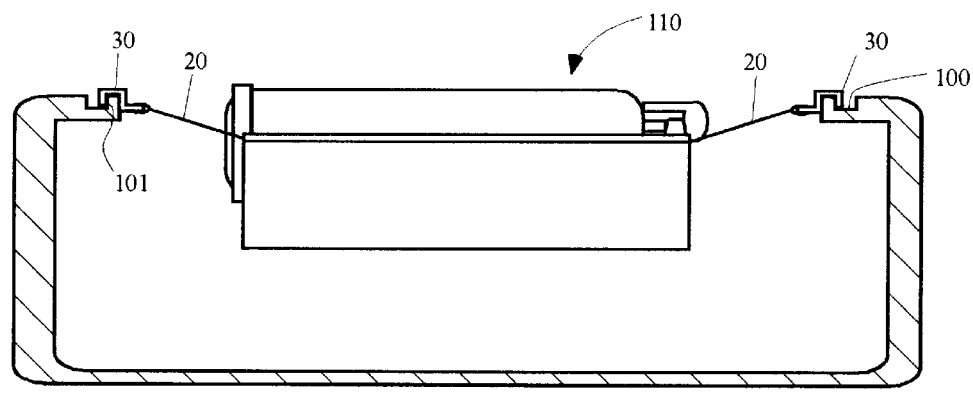
FIG. 3 is a cross-sectional side view of the trunk caddy for transporting a golf bag as in FIGS. 1 and 2 and taken along line A—A of FIG. 2.

As shown in FIGS. 1–3, cradle portion 10 comprises an elongate rigid member which may be comprised of plastic, metal, or any other suitable rigid material. In an alternate embodiment, cradle portion 10 is formed of a panel of flaccid material such as fabric or netting.

As particularly shown in FIG. 4, the hard-shell embodiment of cradle portion 10 is provided with a generally concave contour such that when placed in position within the trunk compartment opening, the cradle portion 10 generally follows the contour of the lower portion of a standard golf bag. In this rigid plastic or metal embodiment, the cradle portion 10 may be formed or molded in said concave shape, providing a wrap-around configuration for supporting the lower portion of the golf bag and ensuring that the golf bag is not jostled from the cradle 10 due to acceleration and deceleration of the automobile. In the flaccid fabric or netting embodiment, cradle portion 10 will assume a concave contour when it is mounted within the trunk opening, and when it is placed under the weight of a traditional golf bag, again ensuring that the golf bag does not get thrown from the cradle during vehicle motion.

Located at opposing ends of cradle portion 10 are connecting straps 20. The rigid plastic or metal embodiment of cradle portion 10 is preferably formed or molded with opposing horizontal edges 12 that protrude laterally a short distance from the concave trough. The edges 12 reinforce the cradle portion 10 and provide a sturdy means for connecting straps 20. Straps 20 may be attached to the edges 12 of cradle portion 10 using any conventional means, such as by adhesive, rivets, or like fastening devices. The edges 12 are unnecessary in the flaccid netting embodiment of cradle portion 10 as the straps 20 may be stitched directly to the cradle portion 10. An optional slotted opening (not shown) may be provided in both the rigid and flaccid embodiments at each point at which a strap 20 is to be attached, thereby allowing strap 20 to be threaded through the slotted opening as a means of holding the strap 20 to cradle portion 10.

Each of straps 20 comprise an elongate section of fabric, preferably woven nylon, that is equipped with mating sections of hook and loop fastening material. In use, the free end of strap 20 opposite cradle portion 10 is threaded through a slot in clamp 30 (to be described), the free end of strap 20 then being folded back over the central portion of strap 20 to bring the mating sections of hook and loop fastening material into contact, thus locking the strap at the desired length. While sections of hook and loop fastening material are preferred, any similar attachment mechanism could likewise be utilized, such as a buckle placed near the midsection of strap 20, or a series of female snap closures running along the central portion of strap 20 with a mating male snap closure member being mounted on the free end of strap 20.

Through the use of sections of hook and loop fastening material, or any other fastening means running along the length of the central portion of straps 20, the user may designate at their option the installed length of each of straps 20, and thereby may position brackets 30 at any preferred distance from cradle portion 10. In this way, the golf bag support of the instant invention may be fitted to a vehicle trunk opening of any size. Further, should the user desire to lower or raise the position of cradle portion 10 with respect to the floor of the trunk well, as may be necessary in order to prohibit the trunk compartment door from coming into contact with the golf bag when the door is closed, straps 20 may likewise be adjusted to increase their installed length and to lower the vertical position of cradle portion 10 within the trunk compartment.

As shown in FIGS. 1–3, clamps 30 serve to attach cradle portion 10, via straps 20, to the opening of a trunk compartment (shown generally at 110). Most conventional vehicle trunk compartments are equipped with a channel 100 running around the periphery of the trunk compartment opening. Channel 100 receives the outermost edges of a trunk compartment door (not shown) such that water and debris are prevented from entering the trunk compartment when the door is in a closed position. However, even when the trunk compartment door is closed, sufficient space remains within channel 100 to receive a clamp 30.

As shown more particularly in FIGS. 5 and 6, clamps 30 are each equipped with a generally S-shaped configuration, having an upper horizontal plate 31, a lower horizontal plate 32, a front vertical plate 33 interconnecting plates 31 and 32, and a rear vertical lip 34. Lower horizontal plate 32 is provided with a slot 35 for receiving straps 20 as explained in detail above. In use, after straps 20 have been applied to clamps 30, clamps 30 are attached to channel 100 by placing rear vertical lip 34 just outside of the inner wall 101 of channel 100, with upper horizontal plate 32 resting on the top wall 102 of the trunk opening, and with front vertical plate 32 resting against the inner wall 103 of the trunk opening (FIG. 3). Under the weight of cradle portion 10 and from the tension in straps 20, a downward and inward force is applied to each of clamps 30. Such downward and inward forces create sufficient friction between clamps 30 and the walls of the trunk channel and the trunk compartment opening to prevent clamps 30 from inadvertently sliding with respect to trunk channel 100. It has been found that in order to ensure an adequate grip against trunk opening 110, an optimal configuration for each of clamps 30 is to provide the following elements having the listed dimensions: an upper horizontal plate having a width A of 1 inch, and a thickness B of ¾ inch; a lower horizontal plate having a width A of 1 inch, and a thickness C of ½ inch; a front vertical plate 33 having a width A of 1 inch, and a height D of 1 inch; and a rear vertical lip 34 having a width A of 1 inch, and a height E of ½ inch. To further improve the gripping ability of clamps 30, optional set screws 36 may be employed as shown in FIG. 6 to tighten the clamps 30 against the trunk channel.

It may therefore be seen that the golf trunk caddy of the present invention provides an improved structure for safely suspending a golf bag (or many other articles) within the trunk compartment of a vehicle in such a way as to maintain the remaining extent of the storage space within the trunk compartment in a usable fashion. While the above specification describes a particularly preferred embodiment, various changes in the details, steps and materials that have been described may be made by those skilled in the art within the principles and scope of the invention herein illustrated and defined in the appended claims. For example, although the cradle of the instant invention is particularly configured to match the contour of a standard golf bag, the support could be used to support any other item. Further, additional straps could be provided to increase the weight capacity of the support, and multiple cradle portions could be used simultaneously to increase the holding capacity of the support. Therefore, having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein, and that the scope of the invention is not to be limited to the details disclosed herein but is to be accorded the fall scope of the claims so as to embrace any and all equivalent apparatus and methods.

I claim:

1. An trunk caddy for providing suspended storage of articles in an automobile trunk, said trunk having a compartment with an overhead opening selectively closeable by a trunk compartment door for allowing access to said trunk, said trunk also having a channel encircling at least a portion of the periphery of said opening, said trunk caddy comprising:
   an elongate cradle having a generally concave cross-section for cradling articles placed therein, said elongate cradle having a first end and a second end;
   a plurality of straps attached to and leading outward from each of said first and second ends of said elongate cradle;
   a plurality of brackets each attached to an end of a corresponding strap for clamping onto said channel surrounding said vehicle trunk opening and thereby collectively suspending said cradle within said vehicle trunk compartment, each of said brackets having an elongate slot therein for receiving one of said straps therethrough, the free ends of said straps being placed through one of said slots for attaching said brackets to said cradle wherein the trunk compartment door is capable of fully closing without interference of said brackets.

2. The trunk caddy according to claim 1, wherein said elongate cradle has a generally concave cross-section for conforming to a golf bag.

3. The trunk caddy according to claim 1, each of said brackets further comprising:
   a front vertical plate having a top edge and a bottom edge;
   a lower horizontal plate extending outwardly from said bottom edge of said front vertical plate, said elongate slot extending through said lower horizontal plate;
   an upper horizontal plate extending outwardly from said top edge of said front vertical plate in the opposite direction of said lower horizontal plate; and
   a rear vertical lip for engaging said bracket with said channel, said rear vertical lip extending downwardly from said upper horizontal plate.

4. The trunk caddy according to claim 3, said rear vertical lip having a height of ½ inch, said front vertical plate having a height of 1 inch, said top horizontal plate having a thickness of ¾ inch, and said bottom horizontal plate having a thickness of ½ inch.

5. The trunk caddy according to claim 1, wherein said elongate cradle further comprises a rigid sheet member having a generally concave contour.

6. The trunk caddy according to claim 1, wherein said elongate cradle further comprises a flaccid sheet member, said flaccid sheet member assuming a generally concave contour when applied to said trunk compartment opening and when an article is placed therein.

7. The trunk caddy according to claim 1, wherein each of said straps further comprises an elongate strip of flaccid material, and attaching means on each said strap for removably attaching said free end of said strap to a variable location along the length of said strap.

8. The trunk caddy according to claim 7, wherein said attaching means further comprises mating sections of hook and loop fastening material positioned at said free end of said strap and along a portion of the length of said strap.

9. A trunk caddy for a golf bag for providing suspended storage of articles in an automobile trunk, said trunk having a compartment with an overhead opening selectively closeable by a trunk compartment door for allowing access to the trunk, said trunk also having a channel encircling at least a portion of the periphery of said opening, said trunk caddy comprising:
   an elongate cradle having a generally concave contour matching a portion of an exterior contour of a golf bag, said elongate cradle having a first end and a second end;
   a plurality of straps positioned at each of said first and second ends of said elongate cradle, each of said straps having a free end and a fixed end, said fixed end being fixedly attached to said elongate cradle; and
   a plurality of brackets attachable to said channel for suspending said cradle from an opening of an automobile trunk compartment above a floor of said trunk compartment, each of said brackets having an elongate slot therein for receiving one of said straps therethrough, and each of said free ends of said straps being placed through one of said slots for attaching said brackets to said cradle; wherein said brackets do not interfere with the closing of the trunk compartment door.

10. The trunk caddy for a golf bag of claim 9, each of said brackets further comprising:
    a front vertical plate having a top edge and a bottom edge;
    a lower horizontal plate extending outwardly from said bottom edge of said front vertical plate, said elongate slot extending through said lower horizontal plate;
    an upper horizontal plate extending outwardly from said top edge of said front vertical plate in the opposite direction of said lower horizontal plate; and
    a rear vertical lip for engaging said bracket with said trunk compartment opening, said rear vertical lip extending downwardly from said upper horizontal plate.

11. The trunk caddy for a golf bag of claim 10, said rear vertical lip having a height of ½ inch, said front vertical plate having a height of 1 inch, said top horizontal plate having a thickness of ¾ inch, and said bottom horizontal plate having a thickness of ½ inch.

12. The trunk caddy for a golf bag of claim 9, said elongate cradle comprising a rigid sheet member having a generally concave contour.

13. The trunk caddy for a golf bag of claim 9, said elongate cradle comprising a flaccid sheet member, said flaccid sheet member assuming a generally concave contour when applied to said trunk compartment opening and when placed under the weight of a golf bag.

14. The trunk caddy for a golf bag of claim 9, each of said straps comprising an elongate strip of flaccid material, and attaching means on each said strap for removably attaching said free end of said strap to a variable location along the length of said strap.

15. The trunk caddy for a golf bag of claim 14, wherein said attaching means comprise mating sections of hook and loop fastening material positioned at said free end of said strap and along a portion of the length of said strap.

16. An trunk caddy for a golf bag for providing suspended storage of articles in an automobile trunk, said trunk having a compartment with an overhead opening selectively closeable by a trunk compartment door for allowing access to the trunk, said trunk also having a channel encircling at least a portion of the periphery of said opening, said trunk caddy comprising:

supporting means for supporting a golf bag from at least a portion of its periphery;

bracket means attachable to said channel for suspending said support means from an automobile trunk compartment opening and above a floor of said trunk compartment; and adjustable fastening means for adjustably attaching said support means to said bracket means at any preferred distance; wherein said bracket means do not interfere with the closing of the trunk compartment door.

17. The trunk caddy for a golf bag of claim 16, said bracket means further comprising:

a front vertical plate having a top edge and a bottom edge;

a lower horizontal plate extending outwardly from said bottom edge of said front vertical plate, said elongate slot extending through said lower horizontal plate;

an upper horizontal plate extending outwardly from said top edge of said front vertical plate in the opposite direction of said lower horizontal plate; and a rear vertical lip for engaging said bracket with said trunk compartment opening, said rear vertical lip extending downwardly from said upper horizontal plate.

18. The trunk caddy for a golf bag of claim 17, said rear vertical lip having a height of ½ inch, said front vertical plate having a height of 1 inch, said top horizontal plate having a thickness of ¾ inch, and said bottom horizontal plate having a thickness of ½ inch.

19. The trunk caddy for a golf bag of claim 16, said support means comprising an elongate rigid sheet member having a generally concave contour.

20. The trunk caddy for a golf bag of claim 16, said support means comprising an elongate flaccid sheet member, said flaccid sheet member assuming a generally concave contour when applied to said trunk compartment opening and when placed under the weight of a golf bag.

* * * * *